(12) United States Patent
Williams et al.

(10) Patent No.: US 7,906,473 B2
(45) Date of Patent: Mar. 15, 2011

(54) MANUAL SPRAY CLEANER

(75) Inventors: Jesse J. Williams, Zeeland, MI (US);
Eric J. Hansen, Ada, MI (US); Lindsay M. Ulman, Rockford, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 1176 days.

(21) Appl. No.: 10/604,780

(22) Filed: Aug. 15, 2003

(65) Prior Publication Data

US 2004/0063600 A1 Apr. 1, 2004

Related U.S. Application Data

(60) Provisional application No. 60/320,145, filed on Apr. 25, 2003, provisional application No. 60/319,548, filed on Sep. 13, 2002.

(51) Int. Cl.
*C11D 3/39* (2006.01)
*C11D 3/395* (2006.01)
*C11D 17/04* (2006.01)

(52) U.S. Cl. ........ 510/406; 510/277; 510/279; 510/303; 510/309; 510/375

(58) Field of Classification Search ................. 510/406, 510/375, 277, 279, 303, 309
See application file for complete search history.

(56) References Cited

U.S. PATENT DOCUMENTS

| | | | |
|---|---|---|---|
| 2,941,696 A | 6/1960 | Homm | |
| 3,236,418 A | 2/1966 | Dalle et al. | |
| 3,236,457 A | 2/1966 | Kennedy et al. | |
| 3,303,970 A | 2/1967 | Breslau et al. | |
| 3,416,709 A | 12/1968 | Shultz et al. | |
| 3,451,593 A | 6/1969 | Dillarstone | |
| 3,488,287 A * | 1/1970 | Seglin et al. | 424/44 |
| 3,521,792 A | 7/1970 | Davidson | |
| 3,575,319 A | 4/1971 | Safianoff | |
| 3,613,956 A | 10/1971 | McCulloch | |
| 3,635,372 A | 1/1972 | Van Dyck et al. | |
| 3,638,786 A * | 2/1972 | Borecki et al. | 206/219 |
| 3,693,837 A | 9/1972 | Yuhas | |
| 3,722,752 A * | 3/1973 | Kenkare et al. | 222/145.1 |
| 3,722,753 A * | 3/1973 | Miles | 222/146.3 |
| 3,731,847 A * | 5/1973 | Webster | 222/94 |
| 3,819,524 A * | 6/1974 | Schubert et al. | 424/47 |
| 3,866,800 A * | 2/1975 | Schmitt | 222/94 |
| 3,970,219 A * | 7/1976 | Spitzer et al. | 222/1 |

(Continued)

FOREIGN PATENT DOCUMENTS

JP 63045045 A 2/1988

(Continued)

*Primary Examiner* — Lorna M Douyon
(74) *Attorney, Agent, or Firm* — McGarry Bair PC

(57) ABSTRACT

A manual spray cleaner for removing dirt and stains from fabrics and carpets comprising a spray bottle having two separate chambers and a single dispensing spray outlet for dispensing controlled amounts of liquids from each of the chambers. One of the chambers has a fabric/carpet cleaning composition therein and the other chamber has an oxidizing composition that enhances the cleanability of the fabric/carpet cleaning composition. The fabric/carpet cleaning composition and the oxidizing composition are simultaneously drawn from their respective chambers and mixed together at the time that they are dispensed from the spray bottle. At least one of the oxidizing composition and the fabric/carpet cleaning composition includes a fabric/carpet protectant. The two compositions are mixed before or after they are sprayed from the bottle. The two compositions can be pressurized with an aerosol propellant or drawn from their respective chambers by a mechanical pump.

30 Claims, 7 Drawing Sheets

U.S. PATENT DOCUMENTS

| | | | |
|---|---|---|---|
| 3,970,584 A * | 7/1976 | Hart et al. | 516/10 |
| 4,019,657 A * | 4/1977 | Spitzer et al. | 222/136 |
| 4,687,663 A | 8/1987 | Schaeffer | |
| 4,773,562 A | 9/1988 | Gueret | |
| 4,792,062 A | 12/1988 | Goncalves | |
| 4,839,081 A * | 6/1989 | Church et al. | 510/159 |
| 5,005,736 A | 4/1991 | Portas | |
| 5,009,342 A | 4/1991 | Lawrence et al. | |
| 5,215,675 A * | 6/1993 | Wilkins et al. | 510/206 |
| 5,301,841 A | 4/1994 | Fuchs | |
| 5,332,157 A | 7/1994 | Proctor | |
| 5,398,846 A | 3/1995 | Corba et al. | |
| 5,421,492 A * | 6/1995 | Barger et al. | 222/402.2 |
| 5,439,610 A | 8/1995 | Ryan et al. | |
| 5,472,119 A | 12/1995 | Park et al. | |
| 5,767,055 A | 6/1998 | Choy et al. | |
| 5,869,440 A | 2/1999 | Kobyashi et al. | |
| 5,888,290 A | 3/1999 | Engle et al. | |
| 5,925,608 A * | 7/1999 | Spruyt et al. | 510/276 |
| 5,928,384 A | 7/1999 | Scialla et al. | |
| 5,948,480 A | 9/1999 | Murphy | |
| 6,021,926 A * | 2/2000 | Lauwers et al. | 222/402.1 |
| 6,043,209 A | 3/2000 | Micciche et al. | |
| 6,131,237 A | 10/2000 | Kasper et al. | |
| RE36,982 E | 12/2000 | Melikyan et al. | |
| 6,177,395 B1 | 1/2001 | Silvaggi et al. | |
| 6,187,738 B1 | 2/2001 | Micciche et al. | |
| 6,214,784 B1 | 4/2001 | Robbins et al. | |
| 6,223,942 B1 | 5/2001 | Markey et al. | |
| 6,308,863 B1 | 10/2001 | Harman | |
| 6,316,399 B1 | 11/2001 | Melikyan et al. | |
| 6,531,437 B1 | 3/2003 | Ryan et al. | |
| 6,583,103 B1 | 6/2003 | Klinkhammer | |
| 6,824,623 B1 * | 11/2004 | Gross et al. | 134/36 |
| 2003/0073602 A1 | 4/2003 | Ramirez, Jr. et al. | |
| 2003/0119697 A1 | 6/2003 | Ozaki et al. | |

FOREIGN PATENT DOCUMENTS

| | | |
|---|---|---|
| JP | 4235295 A | 8/1992 |
| JP | 6247482 A | 9/1994 |
| WO | 02083828 A1 | 10/2002 |

* cited by examiner

MANUAL SPRAY CLEANER

CROSS REFERENCE TO RELATED APPLICATIONS

This application claims the benefit of U.S. Provisional Application Ser. No. 60/320,145, filed Apr. 25, 2003, entitled "Manual Spray Cleaner and Protectants" and U.S. Provisional Application Ser. No. 60/319,548, filed Sep. 13, 2002, entitled "Manual Spray Cleaner and Protectants".

BACKGROUND OF INVENTION

1. Field of the Invention

This invention relates to carpet and fabric cleaners. In one of its aspects, the invention relates to a manual spray cleaner composition. In another of its aspects, the invention relates to a system for cleaning and protecting carpets and fabrics. In yet another of its aspects, the invention relates to a method for cleaning fabrics and carpets. In still another of its aspects, the invention relates to a method for cleaning and protecting fabrics and carpets. In yet another of its aspects, the invention relates to a packaged aerosol spray cleaner with an oxidizing composition.

2. Description of the Related Art

The performance of cleaning compositions with an oxidizing agent deteriorates over a relatively short time if the reactive agents are stored together in a single chamber. For example, when an oxidizing agent is in a cleaning composition containing an activator, the oxidizing agent is stable for only a limited time period. Instability not only reduces the cleaning effectiveness of the composition but may also lead to increased pressure build-up causing the closed chamber to buckle or burst. As a result, various systems have been developed to separately store two-component cleaning compositions and mix the agents upon or immediately prior to application to the desired surface.

The Choy et al. U.S. Pat. No. 5,767,055 discloses an apparatus for cleaning a hard surface, such as kitchen and bathroom tile, comprising a dual chamber bottle having a spray applicator for dispensing a mixture of compositions from each of the two chambers. One of the chambers contains a builder or chelating agent composition and the other chamber includes a hypohalite or hypohalite generator such as sodium hypochlorite as a bleaching agent. The two components of the composition are mixed upon spraying onto a surface.

The Kobyashi et al. U.S. Pat. No. 5,869,440 and the Unilever PCT Publication No. WO 95/16023 both disclose two part bleaching compositions which comprise a peroxide composition and a detergent composition which are stored separately and sprayed onto hard surfaces at the time of combination.

The Van Dyck et al. U.S. Pat. No. 3,635,372 discloses a housing mounting a pair of aerosol chambers, one containing an incapacitating fluid and the other containing a gas. The aerosol chambers have output valves that are connected through tubes to an output nozzle and a whistle. A trigger is pivotally mounted to the housing and moves laterally to displace a vertically movable actuator for simultaneously opening both aerosol valves in the chambers for dispensing the fluid and gas in the chambers.

The Breslau et al. U.S. Pat. No. 3,303,970 and the Safianoff U.S. Pat. No. 3,575,319 disclose a pair of aerosol dispensing chambers having different fluids that are dispensed through outlet valves connected through tubing to a single dispensing orifice. The outlet valves are actuated simultaneously by a trigger that is pivotally mounted to a frame that holds the aerosol chambers. Rotation of the trigger forces the valves downwardly to open the valves simultaneously.

Kasper et al. U.S. Pat. No. 6,131,237 discloses a carpet extractor that has a liquid dispensing and a liquid recovery system. The liquid extraction system includes a clean water tank and a solution tank that are fluidly connected through a mixing valve for variable mixing of water with a cleaning solution. Kasper et al. '237 further discloses that an oxidizing agent, such as persalt, in conjunction with an activator such as tetra acetyl ethylene diamine (TAED), can be incorporated into the cleaning solution, either in the clean water tank, or into the cleaning solution tank. The mixture is then heated in an inline heater to raise the temperature of the detergent oxidizing agent solution into the range of 120-150° F. The oxidizing agent solution can be added to the solution tank and the cleaning solution can be added to the clean water tank. The cleaning solution and the oxidizing agent can then be mixed, heated and applied to the floor. The cleaning solution can be applied to the surface to be cleaned either through a spray nozzle or the nozzle of the accessory hose. The oxidizing agent can be used with or without the inline block heater. The oxidizing agent can be further used with or without the activating agent.

SUMMARY OF INVENTION

According to the invention, a manual spray cleaner comprises two separate chambers and a single dispensing outlet for dispensing controlled amounts of liquids from each of the chambers. One chamber contains a fabric/carpet cleaning composition and the other chamber contains an oxidizing composition that enhances the cleanability of the fabric/carpet cleaning composition. Either the oxidizing composition or the fabric/carpet cleaning composition may optionally include fabric/carpet protectants such as anti-stain and/or anti-soil compositions. In use, the fabric/carpet cleaning composition and the oxidizing composition are simultaneously drawn from their respective chambers and mixed together at the time that they are dispensed from the manual spray cleaner. The two compositions can be mixed before they exit the sprayer or may be mixed at the surface of the fabric or carpet. The compositions can be aerosol propelled or drawn from their respective chambers by a mechanical means such as a pump.

The chambers are preferably made from extruded aluminum in a generally cylindrical shape with an open end. A dispensing opening in a cap is closed by a valve assembly mounted within the chamber open end to close the open end. The valve assembly includes a spring-biased valve to selectively close the dispensing opening for selective release of the respective compositions.

The oxidizing composition chamber valve has components and a dip tube that are preferably made from polypropylene. The cleaner composition chamber valve has components that are preferably made from nylon. The valves further have a valve seat with at least one orifice with a diameter of between about 0.010 inches to 0.040 inches, preferably 0.020 for the cleaner composition valve orifice and 0.024 for the oxidizing composition valve orifice. In one embodiment, the oxidizing composition chamber valve further includes a sealing gasket that seats on the valve seat and that is made from ethylene propylene diene terpolymer (EPDM). A vapor tap orifice of between 0.001 and 0.020 inches in diameter is located through a wall of the valve body of the oxidizing composition chamber.

The containers that form the chambers and associated valve components are either made from a corrosion resistant material such as uncoated aluminum or zinc plated steel or may employ a separator comprising a coating of a material that is inert to the compositions contained therein. Separation may be achieved by sprayed on coatings, laminates, or anodizing the interior surface of the chamber. The inert coating material is selected from the group consisting of polyolefins, epoxy phenolics, polyamide-imides, and vinyl organisols. Further, the chambers are formed in part by an aluminum or zinc plated steel cup, and/or may be laminated with a material inert to the composition, at the outlet opening of the chamber. Further, a dip tube is coated with a polyolefin, preferably high density polyethelyne, that is inert to the composition.

The fabric/carpet cleaning composition preferably comprises one or more cleaning solvents, a surfactant and, optionally, a fragrance. Preferably, the fabric/carpet cleaning composition further includes a pH adjusting agent to maintain a pH level between 7.5 and 12.0, preferably about 9.5, in order to trigger release of oxygen in the oxidizing composition.

In a preferred embodiment of the invention, an aerosol propellant provides the force to expel the fabric/cleaning composition from its chamber. Preferred propellants for the fabric/carpet cleaning composition include dimethyl ether ($C_2H_6O$, also known as DME), hydrocarbons, and natural gases such as compressed air, carbon dioxide, and nitrogen. The fabric/cleaning composition chamber is preferably initially pressurized to 45 pounds per square inch (psi) with the propellant. The cleaning composition and aerosol propellant are combined to create an internal pressure in the range of 1-100 pounds per square inch (psi) with a preferred initial internal pressure of about 45 psi.

The oxidizing composition includes deionized water, a peroxygen compound, a stabilizer and, optionally, an anti-soil and/or anti-stain protectant. The peroxygen composition preferably comprises a cosmetic grade hydrogen peroxide in the range of 0.10%-10% by weight in an aqueous medium; however, other peroxygen compounds can be used. The pH of the oxidizing solution is in the range of about 1.5 to about 8.5, most preferably, about 6.8. The peroxygen composition enhances the cleanability of the fabric/carpet cleaning composition. Suitable anti-stain and anti-soil protectants include Scotchgard™ from the 3M™ Company.

The pH of the cleaning composition and the oxidizing composition can vary over a relatively wide range but the pH of the cleaning composition is greater than 7 and the pH of the oxidizing composition is below 7 before mixture. The pH of the combined cleaning composition and the oxidizing composition is sufficiently greater than 7 to activate the discharge of oxygen from the oxidizing solution for enhanced cleaning of the carpet surface. Preferably, the pH of the combined cleaning composition and the oxidizing composition is greater than 8, and in a preferred embodiment of the invention is about 8.3.

Similar to the fabric/cleaning composition chamber, an aerosol propellant provides the force to expel the oxidizing composition from its chamber. The aerosol propellant can be any suitable aerosol propellant but is preferably dimethyl ether (DME), a fluorinated hydrocarbon (HFC), or a compressed natural gas. The peroxygen composition and aerosol propellant are combined to create an internal pressure in the range of 1-100 pounds per square inch (psi) with a preferred initial internal pressure of about 45 psi.

In one embodiment, the oxidizing composition includes a fabric/carpet protectant. In another embodiment, the carpet cleaning composition includes a fabric/carpet protectant.

The invention provides for a compact package of an effective cleaning agent that includes an oxidizing agent that retains its effectiveness throughout its storage life and is easily delivered to a carpet or upholstery surface with a carpet cleaning solution for spot cleaning. The cleaning compositions according to the invention thus packaged can treat a wide variety of stains on carpet and fabric.

Further according to the invention, a method for cleaning a carpet comprising the steps of simultaneously dispensing a fabric/carpet cleaning composition and an oxidizing composition that enhances the cleanability of the fabric/carpet cleaning composition from separate chambers onto the carpet surface and recovering a soiled carpet cleaning solution from the carpet by blotting or other suitable means is described.

In a preferred embodiment of the invention, the carpet cleaning composition and the oxidizing composition are each aerosol propelled from the separate chambers. Alternatively, the dispensing step includes the step of mechanically pumping each of the compositions from their respective chambers.

In a preferred embodiment, the method further comprises the step of mixing the two compositions together before the dispensing step. Alternatively, the two compositions can be mixed together at the surface of the fabric or carpet after the dispensing step.

Further according to the invention an aerosol package for simultaneously dispensing two different fluids from separate chambers comprises a first container having a first fluid therein under pressure and having a first dispensing outlet controlled by a first valve, a second container, fixed in abutting relationship to the first container, having a second fluid, different from the first fluid, therein under pressure and having a second dispensing outlet controlled by a second valve and a dispenser having a dispensing orifice fluidly connected to each of the first and second dispensing outlets and an actuator connected to each of the first and second valves for simultaneously opening each of the first and second valves to simultaneously dispense fluids from the first and second containers.

In one embodiment of the invention, the dispensing orifice is positioned at one side of the first container distal from the second container. In another embodiment of the invention, the two containers are joined together with an adhesive. In yet another embodiment, the two containers have a thin film stretched around them. The thin film can have printed and/or graphic material on it. Preferably, the film is at least partially transparent.

In another embodiment of the invention, the dispenser comprises an integrally molded body that includes a handle and the actuator, and the actuator is resiliently cantilevered from a portion of the body. Preferably, the molded body further includes an integral channel between the first and second dispensing outlets and the dispensing orifice.

BRIEF DESCRIPTION OF DRAWINGS

The invention will now be described with reference to the accompanying drawings in which.

DETAILED DESCRIPTION

Figure 1:
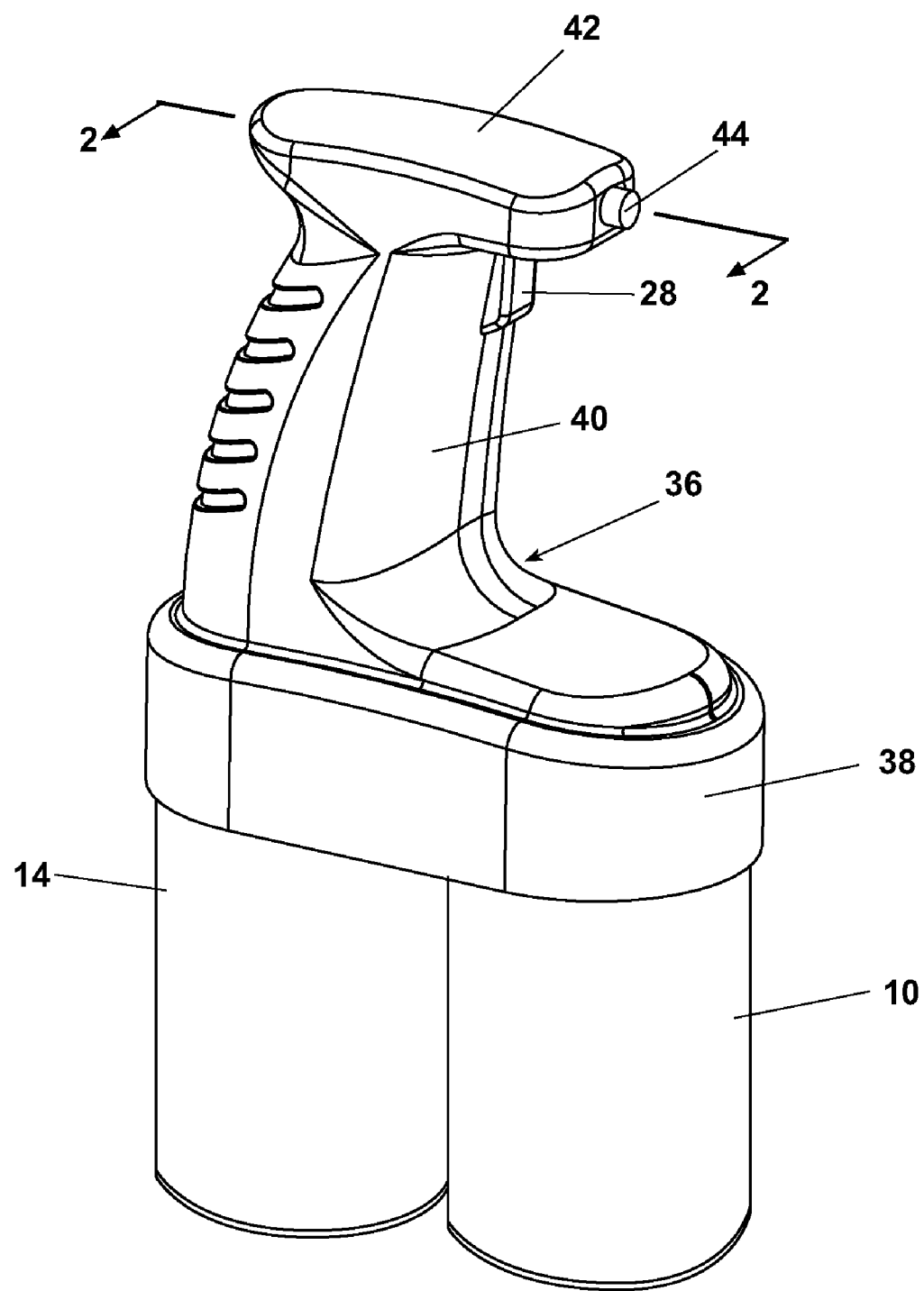
FIG. 1 is a perspective view of an aerosol dispenser according to the invention.
Figure 2:
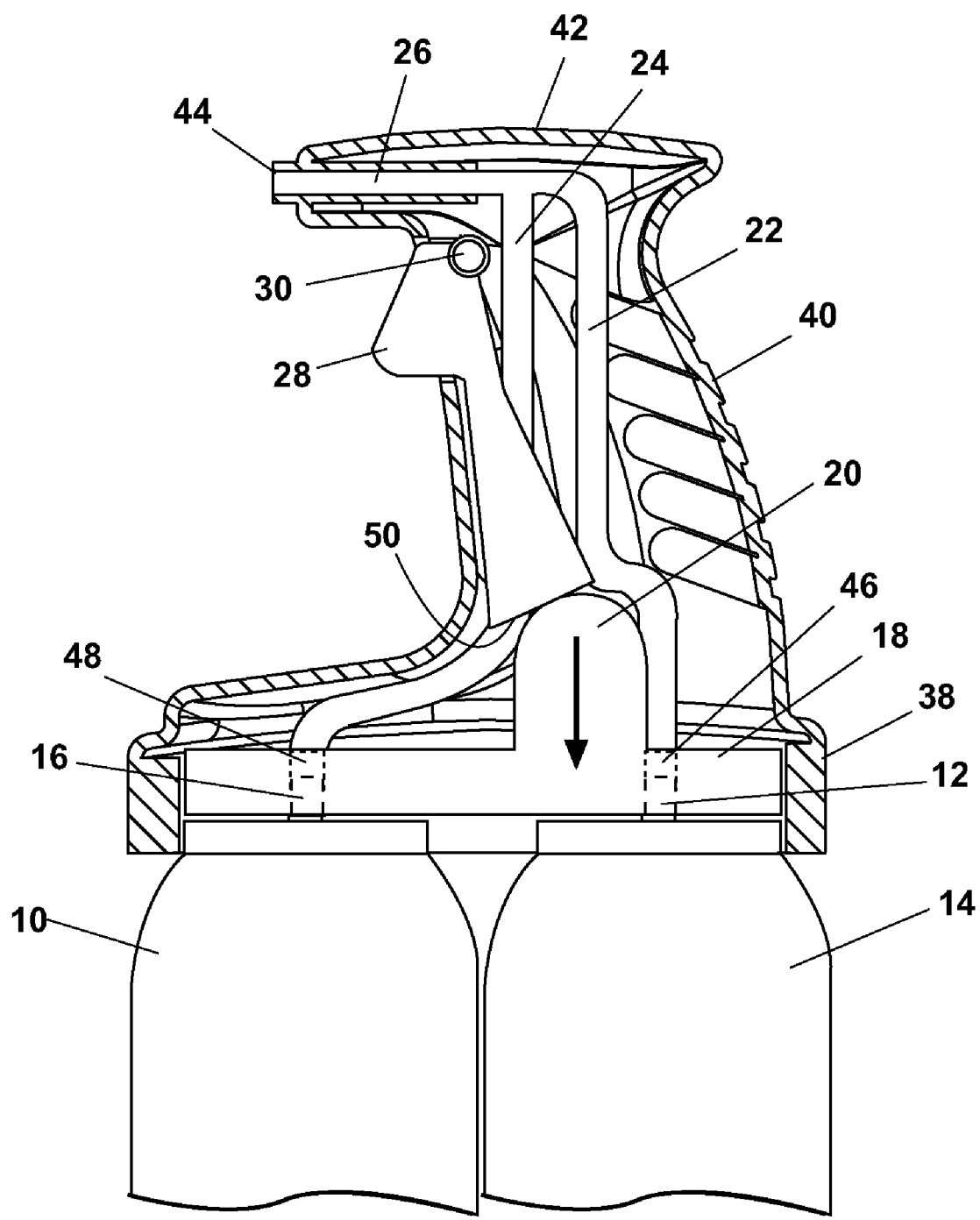
FIG. 2 is a schematic view in section of the aerosol dispenser illustrated in FIG. 1 taken along line 2-2 of FIG. 1.

Referring now to the drawings, and to FIGS. 1 and 2 in particular, there is shown an aerosol dispenser for dispensing cleaning compositions and oxidants from aerosol containers 10 and 14, which have conventional push valves 12 and 16 with outlet openings therein. Material selection for components coming in contact with the contents of the container depends upon the type of aerosol propellant and composition utilized in each container. The preferred propellant is dimethyl ether ($C_2H_6O$, also known as DME). DME is not compatible with nylon; therefore, when DME is the propellant, polypropylene is the preferred material for push valves 12, 16. Alternative propellants can be chosen from the hydrofluorocarbon (HFC) family and particularly 1,1-difluoroethane ($CH_3CHF_2$). A suitable commercially available HFC is Dymel 152A from Dupont. When Dymel 152A is utilized, nylon is the preferred material for push valves 12, 16. A single valve orifice with a diameter in the range of 0.010 inches to 0.040 inches, and preferably 0.020 inches for the cleaner composition valve orifice and 0.024 inches for the oxidizing composition valve orifice, is provided in each push valve 12, 16 to provide an adequate fluid flow therethrough. Alternatively, two valve orifices can be utilized in each push valve 12, 16, each with a diameter in the range of 0.010 inches to 0.040 inches, and preferably 0.020 inches for the cleaner composition valve orifice and 0.024 inches for the oxidizing composition valve orifice. Preferably, containers 10, 14 are made from draw-formed aluminum to minimize the number of seams.

An inert material is applied to the inside surface of containers 10, 14 to physically separate the contents from the container surface. Reactions of peroxygen compounds with metal ions can produce gas that may undesirably increase the pressure inside the container. Furthermore, any reaction that may occur inside the container decreases the cleaning capability of the system because less active ingredient is available at the time of use. The preferred separator is applied on the surfaces of the container and some of the valve components that come in contact with the contents and is made from an inert polymer that is resistant to attack by peroxygen compositions and aerosol mixtures. Suitable commercially available products include epoxy phenolics such as Epon, polyamide-imides such as Pamasol, both available from Courtaulds Coatings, and vinyl organisols such as Micoflex available from Dexter International Corporation. In an alternate embodiment, the separator is a polyethylene or polypropylene bag or laminate that is sealed at the container outlet openings 12, 16. In another alternate embodiment, the separator is a laminate applied to the container surfaces and comprises inert materials such as polyethyleneterephthalate (PET) or polypropylene. In yet another alternative, the separator is formed by anodizing the interior surface of the aluminum container. Steel or tin-plated steel can be used as an alternative to aluminum; however, a separator as previously described is required due to the high reactivity of ferrous ions with peroxygen compositions.

A dispensing head 36 has at a lower portion thereof a retaining skirt 38, which is adapted to releasably retain aerosol containers 10 and 14. The dispensing head 36 further has a grip 40 that extends upwardly from the retaining skirt 38 and forms a hand grip for the user of the dispenser. A head 42 is connected to the top of the grip 40 and has a spray nozzle 44 at one end thereof. A cam trigger 28 is mounted to the grip 40 beneath the head 42.

As illustrated in FIG. 2, the skirt 38 mounts a pressure plate 18 for vertical reciprocatory movement therein. The pressure plate 18 has openings 46 and 48 in register with the push valves 12 and 16, respectively. The openings 46 and 48 are connected through tubes 22 and 24 to a mixing tube 26 that terminates in the spray nozzle 44. The cam trigger 28 is pivotally mounted to the grip 40 through a pivot pin 30. The cam trigger 28 has a lower cam surface 50 that interfaces with a cam follower 20.

As the cam trigger 28 is squeezed inwardly, it forces the cam follower 20 and, thus, the pressure plate 18 downwardly to simultaneously open the push valves 12 and 16. Thus, equal amounts of the solution in the aerosol containers 10 and 14 are simultaneously dispensed through the tubes 22 and 24 respectively and into the mixing tube 26. The mixed solutions are sprayed through the spray nozzle 44 on to a surface to be cleaned.

Figure 3:
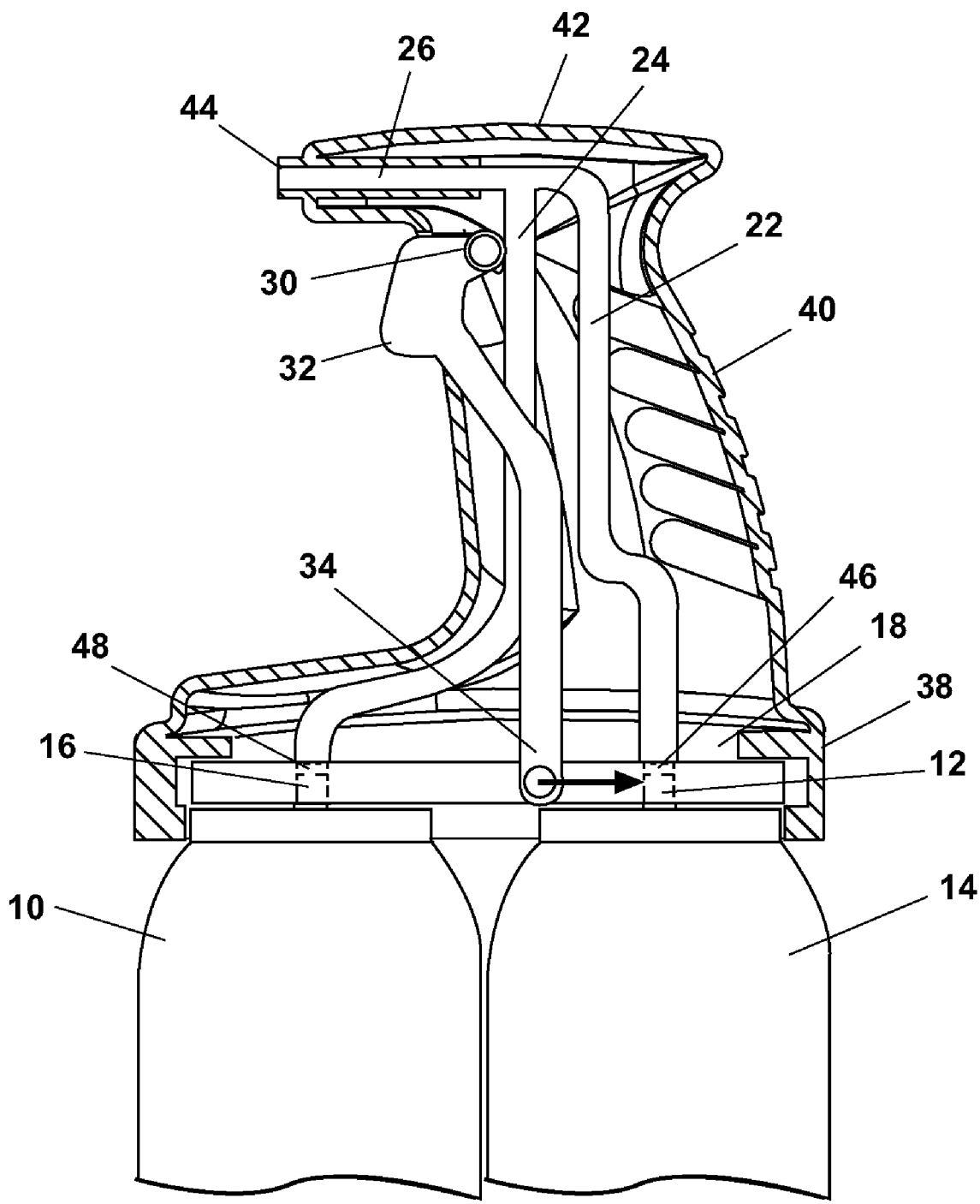
FIG. 3 is a sectional view, like FIG. 2, of modified form of a dual aerosol dispenser according to the invention.
Figure 4:
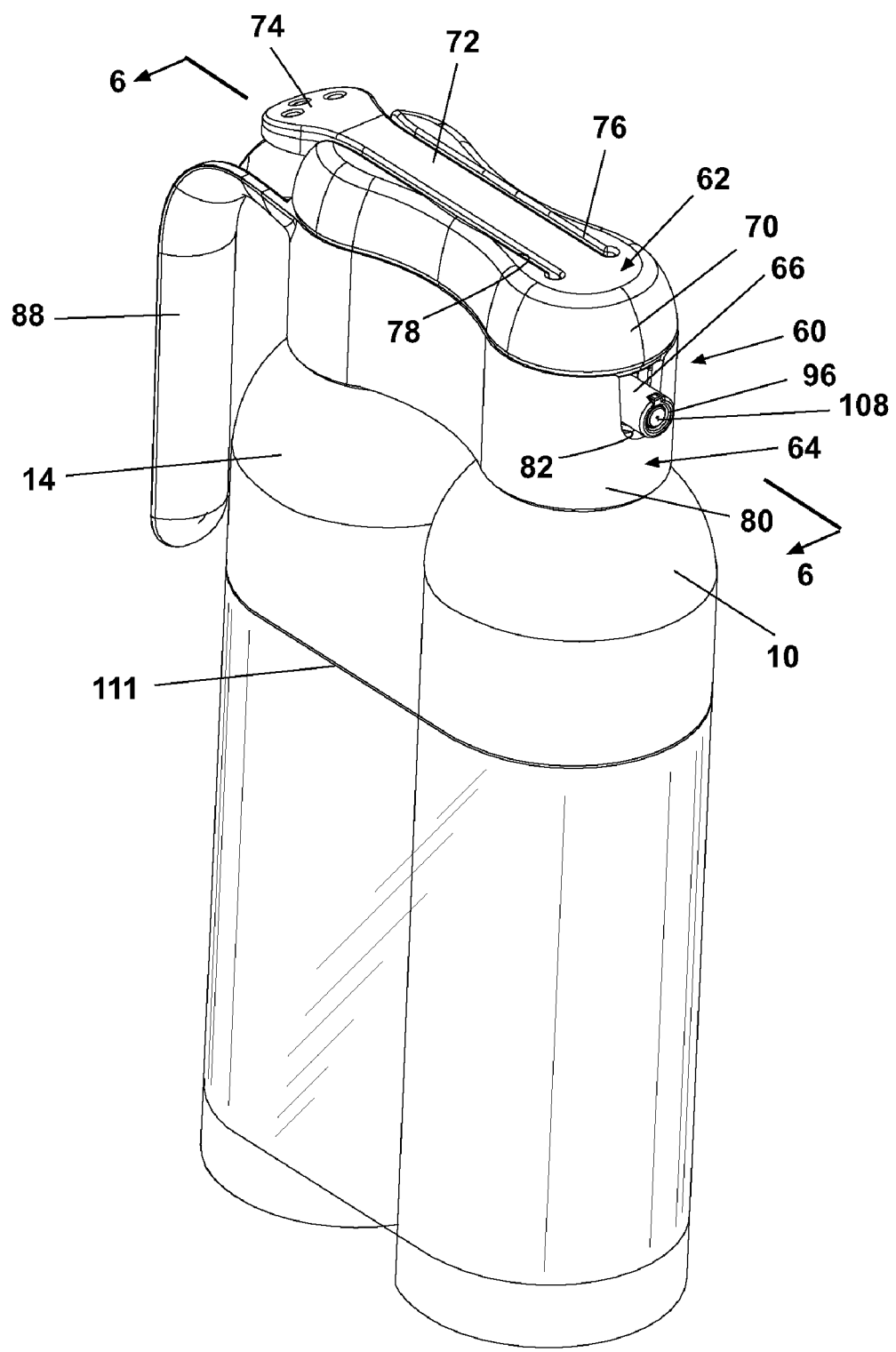
FIG. 4 is a perspective view of an alternative embodiment of an aerosol dispenser according to the invention.

Referring now to FIG. 3, where like numerals have been used to designate like parts, the pressure plate 18 is mounted for horizontal translational movement with respect to the skirt 38. The cam trigger 32 has a cam finger 34, which is pivotally mounted to the pressure plate 18. Thus, as the cam trigger 32 is squeezed and rotates about the pivot pin 30, the pressure plate 18 will be translated horizontally and to the right as viewed in FIG. 3 to open the valves 12 and 16. In this manner, predetermined proportions of solutions in the aerosol containers 10 and 14 are simultaneously dispensed through the tubes 22 and 24 respectively, and into the mixing tube 26 from which the mixture is dispensed through the spray nozzle 44.

Referring now to FIGS. 4 through 9, there is shown an alternative embodiment of an aerosol dispenser 60 comprising a push valve assembly 110 for each container 10, 14, an actuator top 62, a handle base 64, and a dispensing tube 66. Aerosol containers 10 and 14 are releasably mounted within the handle base 64.

Figure 6:
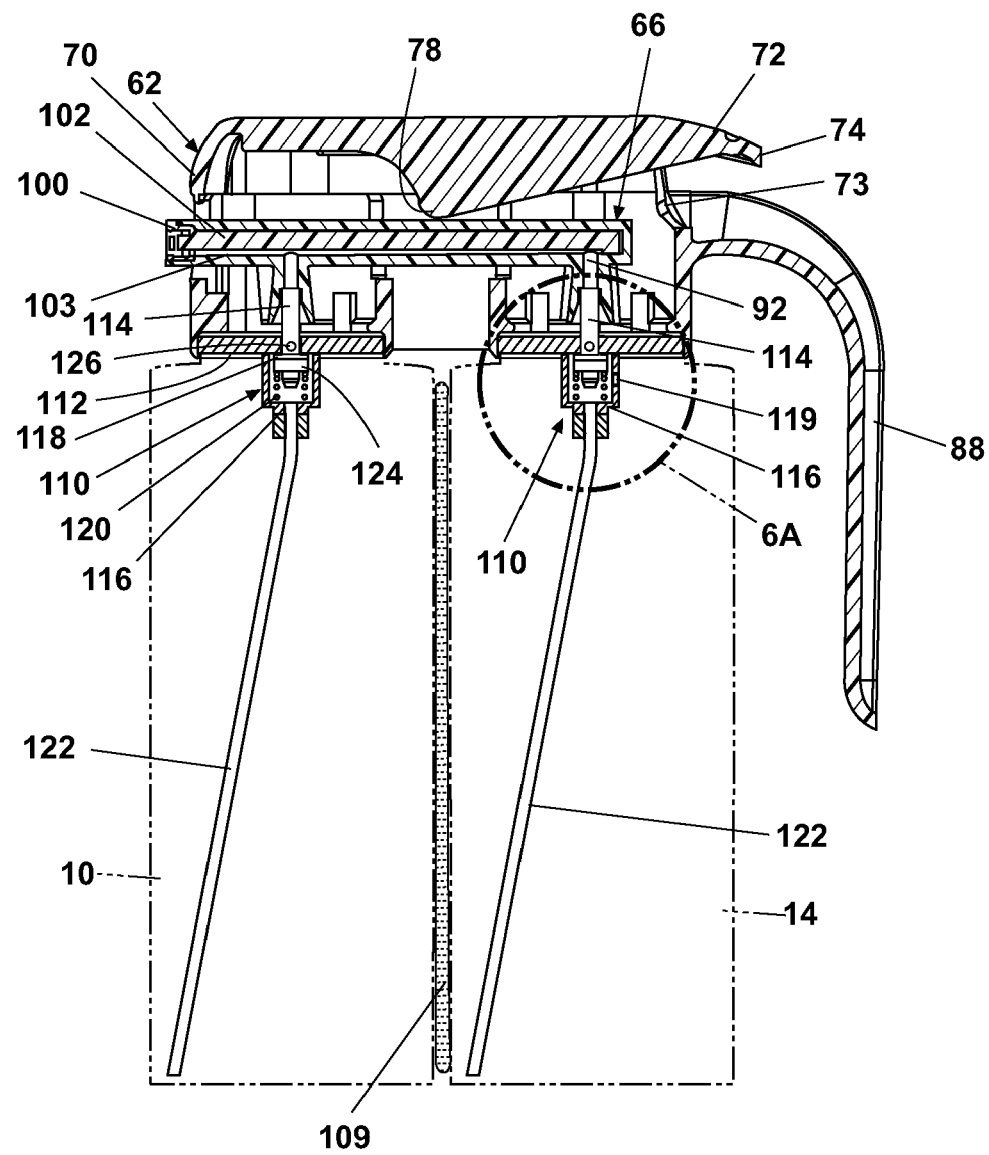
FIG. 6 is a sectional view of the aerosol dispenser illustrated in FIG. 4 taken along line 6-6 of FIG. 4.
Figure 6A:
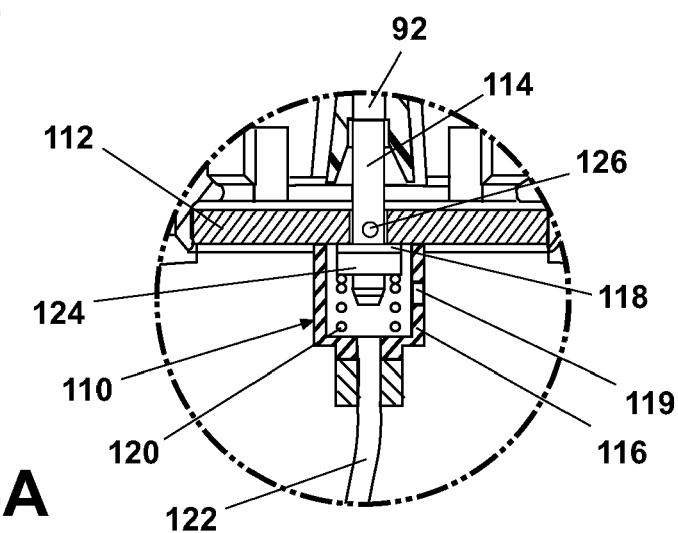
FIG. 6A is an enlarged view of the area in the circle 6A in FIG. 6.

As depicted in FIGS. 6 and 6A, the push valve assembly 110 comprises a valve cup 112, a stem 114, a housing 116, a gasket 118, a spring 120, and a dip tube 122. The valve cup 112 has an annular lip sized to receive and close the open end of the container 10 or 14. Further, the center of the valve cup 112 has an opening 126 therethrough. Preferably, the valve cup 112 is formed of the same material as the containers 10, 14 and lined with a suitable separator material as described above for the containers. Specifically, the container 10, 14 and valve cup 112 are made of the same material type and preferably are comprised of aluminum. Alternatively, these components can be made of steel or zinc-plated steel. Valve cup 112 may optionally comprise a separator, or liner, as described above. The valve stem 114 is mounted to a solid plunger 124 at a lower end an is hollow with preferably one, and optionally two, valve orifices 126 located in the side wall thereof near the bottom end thereof and in fluid communication with the interior of the hollow stem 114. The valve stem 114 is received in an opening 126 of the valve cup 112, with a gasket 118 located between the plunger 124 and the cup 112. The housing 116 has a hollow cylindrical upper portion, a reduced diameter hollow lower portion, and a flange therebetween. The housing 116 surrounds the stem 114 and the gasket 118 at its upper end, and is secured in place by the valve cup 112. Inside the housing 116, the spring 120 is positioned between the lower end of the plunger 124 and the flange of the housing 116 and biases the gasket 118 against the valve cup 112 which forms a seat for the valve. For the oxidizing compound container 14, the housing 116 further includes a vapor tap orifice 119 therethrough in the range of 0.001 to 0.020 inches in diameter and preferably 0.005 inches. The vapor tap orifice 119 vents excess pressure created by the oxidizing compound reacting with contaminants. When the valve stem 114 is depressed, excess vapor pressure is vented through the valve stem 114 before the oxidizing compound is dispensed. The hollow dip tubes 122 are connected to and in fluid communication with the lower portions of the housings 116 and extend to the bottom of the containers 10 and 14 to fill the housings 116 with liquid from the containers under pressure from the aerosol in the containers.

The stems 114, plungers 124, the dip tubes 122 and the housings 116 can be made from nylon or polypropylene depending upon the propellant used and the nature of the composition. In the cleaning composition, any propellant can be used and nylon is the preferred material for the stem 114, plunger 124, the dip tube 122 and housing 116. In the peroxygen container, nylon is preferred when HFC is the aerosol propellant. Polypropylene may be used when any propellant other than HFC is utilized. The gasket 118 is preferably formed from a resilient material, such as Buna-Nitrile (Buna-N) rubber or Butyl rubber, common gasket materials used in the aerosol dispenser industry. However, due to the reactive nature of the oxidizing compound, ethylene propylene diene terpolymer (EPDM) is the preferred gasket 118 material for the oxidizing compound container 14. The spring 120 and the dip tube 122 are preferably composed of stainless steel and polyethylene, respectively. The invention should not be limited to type of push valve assembly 110 described herein, and other push valves well known to those skilled in the art can be utilized with the aerosol dispenser.

The actuator top 62 has a cover housing 70 with an integrally formed actuator finger 72 and a thumb tab 74. The actuator finger 72 is separated along its sides by slots 76, has cam levers 78 that extend downward therefrom, and is resiliently cantilevered from a front portion of the cover housing 70. The actuator top 62 is formed from a resilient plastic material, preferably by injection molding.

Figure 5:
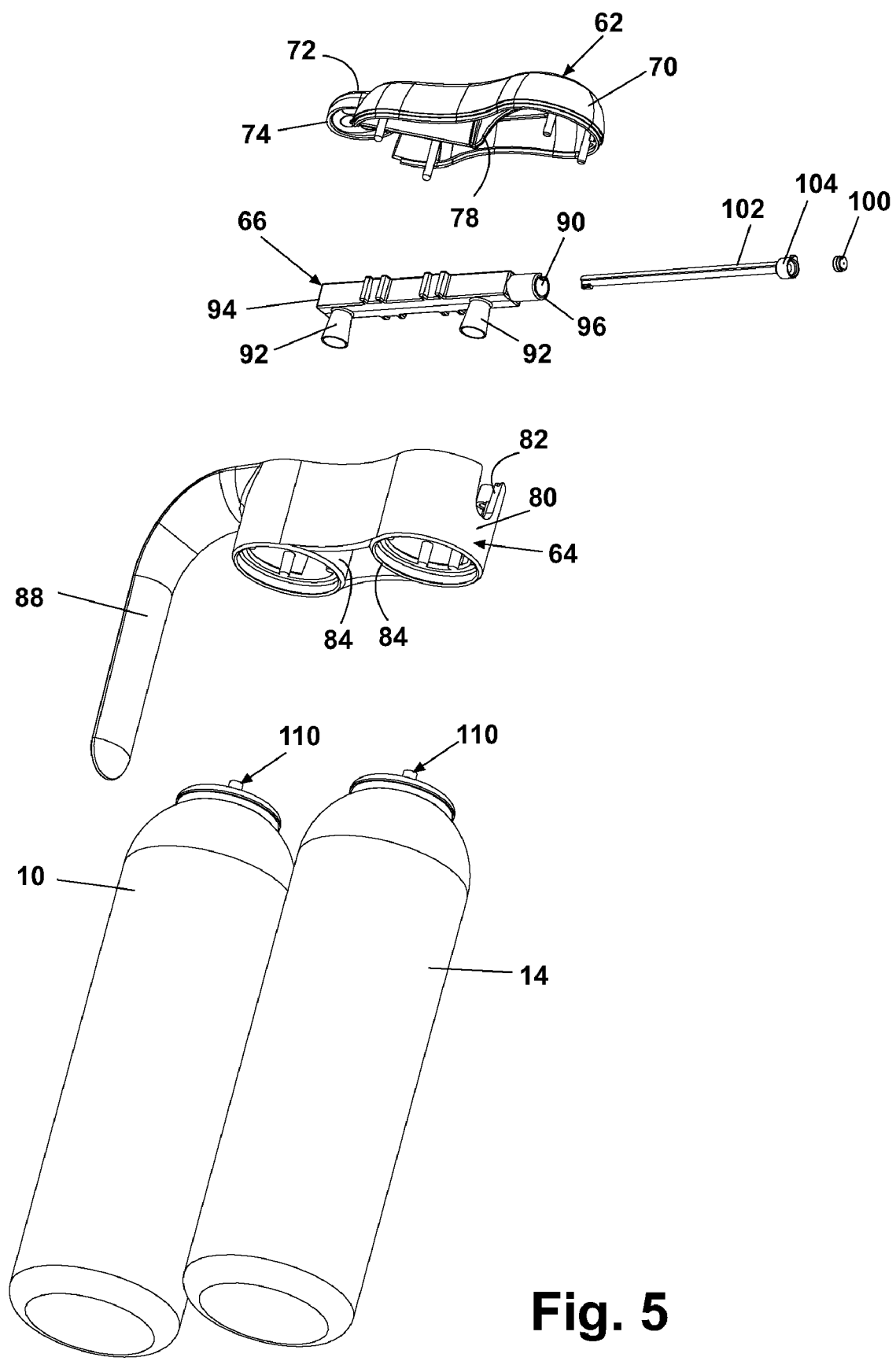
FIG. 5 is an exploded view of the aerosol dispenser illustrated in FIG. 4.

The handle base 64, best shown in FIG. 5, comprises an outer wall 80 having a slot 82 at one end in which is mounted the end of the dispensing tube 66. The handle base 64 further comprises a pair of arcuate inner walls 84, which with outer wall 80 forms cylindrical sockets for the aerosol containers 10 and 14. The arcuate inner walls 84 each have a vertical slot extending from a top portion substantially identical with the slot 82 in the outer wall 80. A handle 88 is integrally formed with the outer wall 80 and is designed so that a user can grip the handle 88 with his or her hand and apply thumb pressure at thumb tab 74 to the actuator finger 72. An integral lock 73 can be formed on an outer end of the actuator finger 72 and project downwardly thereof to abut the handle 88 and prevent accidental depression of the actuator finger 72 prior to sale and use of the dispenser. The integral lock 73 can be attached to the handle 88 with a frangible connection. Upon an intentional act by the user, the integral lock may be disengaged or removed when it is desirable to dispense the contents of the aerosol containers 10 and 14.

Figure 7:
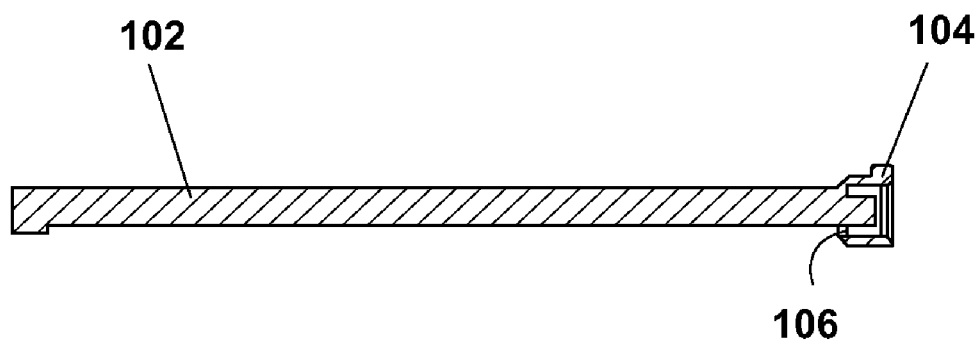
FIG. 7 is a sectional view of a hollow conduit insert illustrated in FIG. 5.
Figures 8, 9:
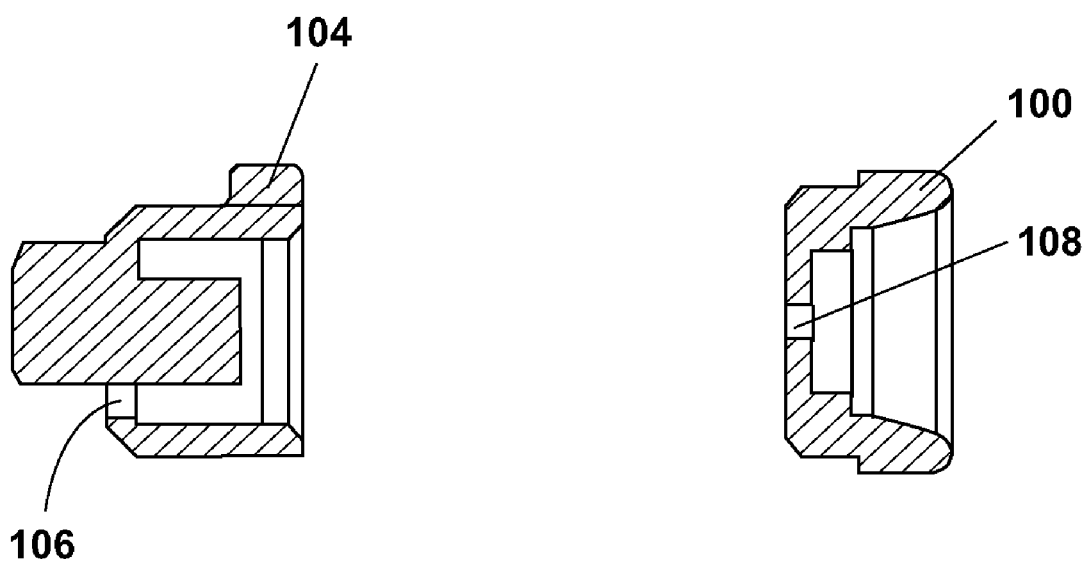
FIG. 8 is a sectional view of a mechanical breakup plug of the hollow conduit insert illustrated in FIG. 5.
FIG. 9 is a sectional view of a terminal orifice of the hollow conduit insert illustrated in FIG. 5.

Referring to FIGS. 5-9, the dispensing tube 66, preferably formed from polypropylene, comprises connecting tubes 92 in fluid communication with the interior of a hollow conduit 90 having a closed end 94 and a nozzle end 96. The connecting tubes 92 have an open lower end sized to receive the hollow upper end of the valve stem 114. Dispensing tube 66 further comprises a hollow conduit insert 102. Hollow conduit insert 102 is a rod shaped structure that fits tightly against an upper wall of the hollow conduit 90 but leaves a cavity 103 of a predetermined volume at a lower wall of the hollow conduit 90. The cavity is in fluid communication with connecting tubes 92 and, therefore, with the hollow upper end of the valve stem 114. A mechanical breakup plug 104, best seen in FIGS. 7 and 8, is located on one end of the conduit insert 102 and forms a part of the nozzle end 96. A spray aperture 106 of a predetermined size is formed at a lower portion of the mechanical breakup plug 104 and aligned with the cavity 103.

A terminal orifice 100, best seen in FIG. 9, is fixedly attached to the mechanical breakup plug 104 and comprises an at least one generally circular terminal aperture 108, preferably having a diameter in the range of 0.020 to 0.040 inches, therethrough that is in fluid communication with the spray aperture 106 and, therefore, the cavity 103 and the connecting tubes 92. The mechanical breakup plug and the terminal orifice force a disrupted flow pattern at the nozzle end 96 of the hollow conduit 90 wherein the contents are mixed and delivered under pressure to the surface to be cleaned.

In the preferred embodiment, the containers 10, 14 are aligned so that the oxidizing compound container 14 is located furthest away from the mechanical breakup plug 104. The containers 10, 14 are attached to one another with a suitable hot melt adhesive 109. A label 111 made from a stretched thermoplastic film material is wrapped around the outside of the two containers 10, 14 and is shrunk fit by a heat source to conform to the outer container walls. In addition to being a suitable surface for displaying marketing graphics, the label 111 provides structural integrity to the arrangement of the cleaning and oxidizing composition containers 10, 14 to maintain alignment of the containers 10, 14 during use. Furthermore, some or all of the label material may be transparent so that the containers 10, 14 are visible to the user.

A wide variety of adhesives can be used to join the containers 10 and 14 together. A suitable adhesive is a Bostik Findley hot melt adhesive sold under the product designation H2790. It has a softening point of 155° F. (68° C.), a suggested running temperature of 279-300° F. (135-149° C.) and a viscosity of 1200-750 cPs @ 275-300° F. (135-149° C.).

The sealed and pressurized container 14 is capable of containing excessive pressure created if the oxidant should come in contact with a reactant inside the container, such as flaws in the separator material, contact with an activator, or trace contaminants in the compounding solvents. The container is designed to an aerosol industry standard 18 bar strength level to provide an adequate safety margin. In the preferred embodiment, the container buckle strength is no less than 250 psi and the burst strength no less than 320 psi.

In operation, the aerosol containers 10 and 14 are equipped with the push valve assemblies 110 by attaching the cups 112 thereto and are releasably mounted within the outer walls 80 of the aerosol dispenser 60 so that the valve stems 114 are seated within the open outer end of the connecting tubes 92. The dispensing tube 66 fits within the slots 82 in the outer wall 80 and within the slots 86 in the arcuate inner walls 84 for vertical reciprocatory movement therein. The top surface of the dispensing tube 66 abuts the underside of the cam levers 78. When a user grips the handle 88 and depresses the actuator finger 72 through thumb pressure at the thumb tab 74, the cam levers 78 are driven downwardly with respect to the handle base 64 to thereby depress the valve stems 114 and the springs 120 so that the valve orifices in the stems 114 are positioned below the gasket 118. In this configuration, the valve orifices are in fluid communication with the housing 116 and the dip tube 122. As a result, the contents of the aerosol container are respectively dispensed in equal proportion through the push valve assembly 100 via the dip tube 122, the housing 116, the valve orifices, and the hollow upper end of the stem 114; through the connecting tubes 92; through the cavity 103 of the hollow conduit 90; through the spray aperture 106 of the mechanical breakup plug 104, and through the terminal aperture 108. The pressure in the aerosol containers 10 and 14 forces the mixture of cleaning solution and oxidizing solution through the terminal aperture 108 in a spray pattern to spray on a carpet or fabric surface. When the pressure on the actuator finger 72 is released, the dispensing tube 66 rises in the slots 82 and 86 under spring pressure from the push valve assemblies 110 to cease the flow of the cleaning composition and the oxidizing composition from the aerosol containers 10 and 14.

The proper combination of valve orifice size, cavity 103, terminal aperture 108 size, and propellant pressure are required to achieve the desired ratio and flow rate of cleaning compositions and oxidants and spray pattern for a given distance from the surface to be cleaned. Preferably, a 1:1 ratio of cleaning composition and oxidant is dispensed at a flow rate of 3 8 grams per second, preferably 5 grams per second, in a circular spray pattern having a diameter less than 2 inches when the containers 10, 14 are 2 feet away from the target surface.

A fabric/carpet cleaning formula composition for removing stains and soil from carpets and fabrics such as upholstery fabrics is filled into one of the aerosol containers. This composition includes one or more cleaning solvents, a surfactant, de-ionized water and, optionally, a fragrance. According to the invention, the cleaning composition further includes a pH adjusting agent to maintain a pH in the cleaning solution between 7.5 and 12.0 in order to trigger release of oxygen in the oxidizing composition. The cleaning composition can also include an anti-stain and/or anti-resoil agent. An example of the anti-stain protectant is PM 1874, a sulfo-methacrylate resin, manufactured by the 3M Company. An example of the anti-soil component is PM 1870, a polysilosane derivative in the silsesquioxane chemical family, also manufactured by the 3M Company. Other components may include acrylic polymers.

De-ionized water is preferred as the solvent medium for the cleaning composition. The de-ionized water minimizes contamination of the cleaning solution from trace minerals in the water. One advantage of using de-ionized water as a solvent is that it evaporates with little or no residue after delivering cleaning agents to the carpet or upholstery. Alternative cleaning solvents can be one or more glycol ethers, for example dipropylene glycol monomethyl ether, or Glycol Ether DPM, and propylene glycol normal propyl ether, Glycol Ether PNP, or one of the terpenes such as natural terpenes including d-limonene. These components can be present in the cleaning composition in effective amounts. For example, the Glycol Ether DPM can be present in the range of 0.5 to 1.5, preferably 0.8 wt. % in the composition. Glycol Ether PNP can be present in the range of 0.8-15.0, preferably 7.2 wt. %. D-limonene, when used, can be present in the range of 0.1 to 5.0, preferably 0.3 wt. % in the composition.

Non-ionic surfactants can be present in a range of about 0.1 to 2.0. Tomadol 23-6.5, a non-ionic surfactant comprising ethylene oxide attached to lineal alcohol, is preferably present at about 0.8 wt. %. Alternatively, Neodol 23-6.5, another alcohol ether, can be present at about 1.8 wt. %.

The EDTA can be present in amounts between about 0.1 and 5.0, preferably 0.4 wt %, in compositions that include 40% EDTA solution.

In the aerosol propelled composition embodiment, the propellant for both containers is preferably dimethyl ether ($C_2H_6O$, also known as DME). An alternative propellant can be the hydrofluorocarbon (HFC) family, particularly 1,1-difluoroethane ($CH_3CHF_2$). A suitable commercially available HFC is Dymel 152A from Dupont. The concentration of Dymel 152A in the cleaning composition can be in the range of 1%-25% by weight and preferably 5%. Yet other alternative propellants include hydrocarbons such as isobutene ($C_4H_{10}$), propane ($C_3H_8$), and liquefied petroleum gas; and natural gases including compressed air, carbon dioxide, and nitrogen.

Pressurization within the cleaning composition container can range from 1 to 100 pounds per square inch (psi). When DME is the propellant, dual 0.020 inch push valve orifices and an internal pressure of 45 psi are preferred. When a HFC propellant is used, a single 0.020 inch orifice is employed at an internal pressure of 70 psi.

The pH adjusting agent is also used to remove trace amounts of iron and other contaminates. A typical pH agent is EDTA (ethylenediteramine). Other suitable pH agents include disodium EDTA, an example of which is Hampene Na2.

The cleaning composition can further include an activator for the oxidizing composition. The preferred activator is sodium carbonate, however, other suitable activators include metals ions, metals salts, and other carbonates such as sodium bicarbonate. Still other suitable activators include tetraacetylethylenediamine, sodium octanoyloxybenzene sulfonate, sodium nonanoyloxybenzene sulfonate, sodium decanoyloxybenzene sulfonate, (6-octanamido-caproyl) oxybenzenesulfonate, (6-nonanamido-caproyl) oxybenzenesulfonate, 6-decanamido-caproyl) oxybenzenesulfonate, and mixtures thereof. In the preferred embodiment, sodium carbonate can be added as an activator in an amount of at least 0.1 wt. % and preferably 0.5 wt. % to reach a stoichiometric ratio of activator to reactant.

The cleaning composition can also include anionic surfactants that create a friable residue that can be vacuumed after the cleaning process. A suitable anionic surfactant is sodium lauroyl sarcosinate, such as Hamposyl L-30 Type 724, and can be present in suitable amounts, for example between 1.0 and 6.0, preferably 3.3 wt. %.

In addition to the foregoing, the cleaning composition can further include a dispersant for soil and a further pH stabilizer such as Alcosperse 602N, which is an acrylate polymer.

The oxidizing composition is filled into the other aerosol container and includes de-ionized water, a peroxygen compound, a stabilizer and, optionally, anti-soil and/or anti-stain protectants. An example of the anti-stain protectant is PM 1874, manufactured by the 3M Company. An example of the anti-soil component is PM 1870 from the silsesquioxane chemical family, also manufactured by the 3M Company. Other components may include acrylic polymers. Suitable soil-resist or anti-soil compositions are disclosed in the U.S. Pat. No. 5,888,290, which is incorporated herein by reference.

The de-ionized water in the oxidizing solution is present in a range of about 70 to about 99 wt. %, preferably about 88.3 wt. %. De-ionized water is important in the oxidizing solution to minimize contaminants that will initiate activation inside the container, reducing the cleaning efficacy of the composition and creating an undesirable increase in internal pressure. The peroxygen compound can be present in a range of about 0.4% to 29%, preferably 11.4%, of the active ingredients resulting in a total fill concentration of about 0.1%-10% by weight with a preferred value of about 4 wt. %.

The peroxygen compound is preferably a cosmetic grade hydrogen peroxide ($H_2O_2$), however other peroxygen compounds can be used. A suitable commercially available 35% cosmetic grade hydrogen peroxide is available from the Degussa Company and is preferred because of its superior stability characteristics and extended shelf life. Other suitable hydrogen peroxides are available from Solvay Interox. Yet another suitable hydrogen peroxide is provided by FMC Industrial Chemicals under the trade names Hybrite 32.5%, Durox, Oxypure 35%, Standard 27.5 35%, Super D 25 and 35, Technical 35%, Chlorate Grade 20%, Semiconductor Reg, Seg, RGS, RGS 2, RGS 2, 31%. Alternatively, the peroxygen compound can be a preformed peracid compound selected from the group consisting of percarboxylic acid and salts, percarbonic acids and salts, perimidic acids and salts, peroxymonosulfuric acids and salts, and mixtures thereof; a persalt such as perborate compounds, percarbonate compounds, perphosphate compounds and mixtures thereof; or a peroxide compound.

The anti-stain ingredient in the oxidizing solution can be present in about 1 to 5 wt. %, typically about 1.7 wt. %. The anti-soil ingredient is typically present in less than 1% by weight, typically about 0.3 wt. % in the composition.

The pH stabilizer will maintain the oxidizing composition at a pH level in the range of 1.5 to 8.5, preferably about 6.8. Pentasodium diethylenetriamine pentaacetate, for example Versenex 80, is an appropriate pH stabilizer when oxidative conditions exist. It will also neutralize any trace elements of contaminates in the oxidizing composition.

The aerosol propellant for the oxidizing composition is preferably dimethyl ether ($C_2H_6O$, also known as DME). Alternative propellants may be chosen from the hydrofluorocarbon (HFC) family, hydrocarbons, and natural gasses. A suitable HFC is 1,1-difluoroethane ($CH_3CHF_2$), commercially available as Dymel 152A from Dupont. The concentration of Dymel 152A in the oxidizing composition can be in the range of 1%-25% by weight, preferably 5%. A particularly suitable hydrocarbon is N-Butane ($C_4H_{10}$). Alternative hydrocarbon materials include isobutene ($C_4H_{10}$), propane ($C_3H_8$), and liquefied petroleum gas. Natural gases include compressed air, carbon dioxide, and nitrogen.

Pressurization within the oxidizing container can range from 1 to 100 pounds per square inch (psi). When DME is the propellant, a single 0.024 inch orifice is preferred at a preferred pressure of about 45 psi. Alternatively, dual 0.020 inch orifices can be employed with DME. When HFC is the propellant, a single valve orifice of 0.018 inches is used and the preferred pressure is about 70 psi.

The pH values of the cleaning composition and the oxidizing composition can vary over a wide range but are selected, taking into consideration the volume of each composition that is dispensed simultaneously, so that the pH of the combined cleaning composition and the oxidizing composition is sufficiently greater than 7 to activate the discharge of oxygen from the oxidizing solution for enhanced cleaning of the carpet surface. In a preferred embodiment the pH is the combined cleaning composition and the cleaning composition is greater than 8, preferably about 8.3.

Examples

Spot cleaning compositions were prepared with the following ingredients in Table 1:

TABLE 1

| Cleaning Compositions | | | | | | | | |
|---|---|---|---|---|---|---|---|---|
| Ingredients | A | B | C | D | E | F | G | H |
| Deionized Water | 83.40 | 83.67 | 82.90 | 83.40 | 83.50 | 83.80 | 90.80 | 89.35 |
| Sodium Carbonate | 0.50 | 0.40 | 0.50 | 0.50 | 0.50 | | | |
| Dowanol PNP[1] | 15.00 | 15.00 | 14.70 | 15.00 | 14.80 | 15.00 | | |
| Fragrance[2] | 0.10 | 0.10 | | | | 0.10 | 0.10 | 0.05 |
| Tomadol 23-6.5[3] | 0.80 | 0.66 | 0.80 | 0.66 | 0.80 | 0.60 | 0.70 | |
| Petro ULF[4] | 0.20 | 0.17 | 0.80 | 0.34 | 0.20 | | | |
| d-limonene | | | 0.30 | 0.10 | 0.30 | | | |
| EDTA, 40% | | | | | | 0.40 | 0.40 | |
| Glycol Ether DPM | | | | | | | 0.80 | 0.50 |
| Glycol Ether PNP | | | | | | | 7.20 | 4.50 |
| Hampene Na2[5] | | | | | | | | 0.50 |
| Neodol 23-6.5[6] | | | | | | | | 1.80 |
| Hamposyl L-30 Type 724[7] | | | | | | | | 3.30 |
| Alcosperse 602N[8] | | | | | | | | |

| Ingredients | I | J | K | L | M | N | O | P |
|---|---|---|---|---|---|---|---|---|
| Deionized Water | 88.85 | 85.80 | 82.90 | 82.90 | 87.00 | 89.70 | 89.9 | 90.80 |
| Sodium Carbonate | | | | | | | | |
| Dowanol PNP[1] | | | | | | | | |
| Fragrance[2] | 0.05 | 0.10 | 0.10 | 0.10 | 0.10 | 0.10 | 0.10 | 0.10 |
| Tomadol 23-6.5[3] | | | | | | | | |
| Petro ULF[4] | | | | | | | | |
| d-limonene | | | | | | | | |
| EDTA, 40% | | | | | | | 0.50 | 0.40 |
| Glycol Ether DPM | 0.50 | 0.80 | 1.50 | | 7.20 | 0.80 | 7.20 | 0.80 |
| Glycol Ether PNP | 4.50 | 7.20 | 13.50 | 15.00 | 0.80 | 7.20 | 0.80 | 7.20 |
| Hampene Na2[5] | | | | | | | | |
| Neodol 23-6.5[6] | 1.80 | 1.80 | 1.00 | 1.00 | 0.40 | 0.70 | 0.50 | 0.70 |
| Hamposyl L-30 Type 724[7] | 3.30 | 3.30 | | | 3.00 | | 1.00 | |
| Alcosperse 602N[8] | 1.00 | 1.00 | 1.00 | 1.00 | 1.50 | 1.50 | | |

[1] Glycol ether, a solvent, manufactured by Dow Chemical Company.
[2] Sapphire fragrance, manufactured by Firmenich.
[3] Linear primary alcohol ethoxylate, a non-ionic surfactant, manufactured by Tomah Chemical Company.
[4] Sodium alkyl napthelene sulfonate from AKZO Nobel.
[5] Disodium EDTA, manufactured by Hampshire Chemical.
[6] Alcohol ether, a non-ionic surfactant, manufactured by Shell Chemicals.
[7] Sodium lauroyl sarcosinate, an anionic surfactant, manufactured by Hampshire Chemical.
[8] Acrylate polymer, a pH stabilizer, manufactured by Alco Chemical.

For all of the samples, the pH of the cleaning composition was 11.3±0.3.

The compositions of the oxidizing solutions were as follows in Table 2:

TABLE 2

Oxidizing Solutions

| Ingredients | A | B | C |
|---|---|---|---|
| Deionized Water | 88.30 | 77.70 | 79.70 |
| Hydrogen Peroxide, Cosmetic Grade 35% | 11.40 | 20.00 | 20.00 |
| Versenex 80[1] | 0.30 | 0.30 | 0.30 |
| PM 1874[2] | | 1.70 | |
| PM 1870[3] | | 0.30 | |

[1]Pentasodium diethylenetriamine pentaacetate, a pH stabilizer, manufactured by Dow Chemical Company.
[2]Sulfo-methacrylic polymer, an anti-stain protectants, manufactured by the 3M Company.
[3]Polysilosane derivative, an anti-soil ingredient, manufactured by the 3M Company.

For all of the samples, the pH of the oxidizing solution was 6.8±0.3.

Any of the cleaning compositions may be combined with any of the oxidizing solutions to achieve acceptable cleaning results. The preferred combinations are shown in Table 3. Although any combination of cleaner and oxidizer will result in acceptable results, each combination exhibits different characteristics. From a chemistry perspective, the technically superior result is a combination of cleaner A and oxidizer A. However, when cost of ingredients is taken into account, cleaner F combined with oxidizer A is the best choice for consumer value. The best cleaning performance was exhibited by cleaner A combined with oxidizer C, and the best protection was provided by cleaner A combined with oxidizer B.

TABLE 3

Preferred Compositions

| Composition | Technically Superior | Superior Cleaner | Superior Protection | Market Choice |
|---|---|---|---|---|
| Cleaning Composition | A | A | A | F |
| Oxidizing Solution | A | C | B | A |

The pH of the combined cleaning composition and oxidizing solution as expelled for all samples was 8.3±0.3.

Test Method

Two separate containers were partially filled with the carpet cleaning solution and the oxidizing solution. The containers were then partially filled with an aerosol propellant. The two compositions were then dispensed through a common spray nozzle onto carpet samples that had been pretreated with stains from red wine, grape juice, spaghetti sauce, chocolate syrup, red lipstick, and blue ballpoint pen ink. The carpets were scrubbed moderately with a brush and then were vacuumed with a suction cleaner to remove the soiled solution. Cleaning was measured using a calibrated spectrophotometer on the stain at both the front and back of the carpet sample. Results were calculated as $\Delta E$, the difference in spectrophotometer readings from the clean, virgin carpet and the carpet after the stain was removed ($\Delta E$=virgin reading cleaned reading). The lower the $\Delta E$ value, the less stain remains. The stains were satisfactorily removed. The average results for each stain for the preferred combination of cleaner C and oxidizer A (Market Choice from Table 3) are presented in Table 4.

TABLE 4

Results of Significant Outcomes for Market Choice

| Stain | $\Delta E$ Value Front Market Choice |
|---|---|
| Grape Juice | 2.97 |
| Koolaid (Cherry) | 8.03 |
| Coffee | 5.99 |
| Red Wine | 3.72 |
| Cola | 1.59 |
| Lipstick (Red) | 15.97 |
| Spaghetti | 13.67 |
| Black Ink | 44.25 |
| Dirty Motor Oil | 21.26 |
| Chocolate Syrup | 27.27 |

Whereas the invention has been described with respect to an aerosol dispensing package for the cleaning solution and oxidizing solution, many other delivery forms can be used. For example, a dual siphon manual trigger dispenser having a fixed or variable ratio can be used. Such manual trigger dispensers are disclosed in U.S. Pat. Nos. 5,332,157, 4,862,052, 4,821,923 and 4,432,469, all of which are incorporated herein by reference.

The cleaning solution and oxidizing solution can be dispensed from separate squeeze containers. For example, a dual chamber blow molded bottle, such as disclosed in U.S. Pat. No. 5,676,055, 4,835,804, 4,776,972 or 4,720,351 can be used.

The trigger can be battery powered as well as being manual. It can have a fixed or variable ratio.

Another alternative container and dispensing system for the cleaning composition and oxidizing compositions according to the invention is a dual chamber squeeze bottle as, for example disclosed in U.S. Pat. No. 4,585,149 or 6,216,915, both of which patents are incorporated herein by reference.

Anti-stain compositions according to the invention are disclosed in U.S. Pat. No. 5,948,480. Anti-soil compositions used in the invention are disclosed in U.S. Pat. Nos. 6,043,209, 5,534,167, 5,888,290, all of which are enclosed herewith by reference.

Still further, the cleaning and/or oxidizing solution can themselves contain components which, when mixed, generate heat so that the cleaning and oxidizing solution applied to a surface are applied at elevated temperatures. Examples of compositions and systems for generating heat in the cleaning and/or oxidizing solutions are disclosed in U.S. Publication No. US-2003-0075203-A1, which was published on Apr. 24, 2003, and is incorporated herein by reference.

Reasonable variation and modification are possible within the forgoing disclosure and drawings without departing from the spirit of the invention that is defined in the appended claims.

What is claimed is:
1. A manual spray cleaner for removing dirt and stains comprising:
   a first pressure chamber and a dispensing spray outlet for dispensing controlled amounts of fluids under pressure from the pressure chamber onto a surface to be cleaned;
   a peroxide composition within and contained by the pressure chamber, and;
   a propellant mixed with the peroxide composition to pressurize the peroxide composition within the first pressure chamber to a level sufficient to spray the peroxide composition onto a surface to be cleaned;
   wherein the first pressure chamber has an inner surface formed wholly from uncoated aluminum and the dispensing assembly is made from materials that are inert or resistant to the peroxide composition.

2. A manual spray cleaner for removing dirt and stains according to claim 1 wherein the peroxide composition includes deionized water, a peroxide compound, a stabilizer and, optionally, anti-soil and/or anti-stain protectants.

3. A manual spray cleaner according to claim 2 wherein the peroxide compound is hydrogen peroxide.

4. A manual spray cleaner according to claim 1 wherein the concentration of the active peroxide in the peroxide composition is in the range of about 0.1%-10% by weight.

5. A manual spray cleaner for removing dirt and stains according to claim 1 wherein the first pressure chamber is made from drawn aluminum.

6. A manual spray cleaner for removing dirt and stains according to claim 5 wherein the dispensing spray outlet comprises a normally closed pressure valve that is connected to a dip tube that extends from the normally closed valve into the chamber, and wherein both the dip tube and the normally closed valve are made from thermoplastic materials that are inert to the peroxide composition.

7. A manual spray cleaner for removing dirt and stains according to claim 6 wherein the thermoplastic material for the dip tube is an olefin polymer.

8. A manual spray cleaner for removing dirt and stains according to claim 7 wherein the thermoplastic material for the normally closed valve is nylon.

9. A manual spray cleaner for removing dirt and stains according to claim 8 wherein the normally closed valve contains a spring that is made from stainless steel.

10. A manual spray cleaner for removing dirt and stains according to claim 9 wherein the normally closed valve has at least one orifice having a diameter of about 0.024 inches.

11. A manual cleaner according to claim 6 wherein the dispensing assembly further comprises a gasket to seal the first chamber and the gasket material is an ethylene propylene diene terpolymer.

12. A manual cleaner according to claim 1 wherein the aluminum within the first chamber is anodized.

13. A manual cleaner according claim 1 wherein the peroxide composition further comprises an anti-soil and/or anti-stain protectant.

14. A manual cleaner according to claim 1 wherein the first chamber is formed in part by a cup, and the outlet opening for the first chamber is positioned in the cup, and the cup is formed wholly of uncoated aluminum.

15. A manual cleaner according to claim 1 wherein the propellant for the first chamber is dimethyl ether, a fluorinated hydrocarbon or compressed natural gas.

16. A manual cleaner according to claim 1 wherein the first chamber is pressurized to about 45 pounds per square inch.

17. A manual cleaner according to claim 1 and further comprising:
a second chamber that has a fabric/carpet cleaning composition therein and that is mounted adjacent the first chamber; and
a dispensing system for simultaneously dispensing the fabric/carpet cleaning composition and the peroxide composition from their respective chambers' outlet under pressure.

18. A manual cleaner according to claim 17 wherein at least one of the fabric/carpet cleaning composition and the peroxide composition includes a fabric/carpet protectant.

19. A manual cleaner according to claim 18 wherein the fabric/carpet protectant includes at least one of an anti-resoil and anti-stain agent.

20. A manual cleaner according to claim 17 wherein the dispensing system is adapted to mix the two compositions together at the surface of the fabric or carpet and after they are dispensed from the dispensing outlet.

21. A manual cleaner according to claim 17 wherein the dispensing system includes an aerosol propellant in the second chamber.

22. A manual cleaner according to claim 21 wherein the aerosol propellant for the second chamber comprises dimethyl ether and the valve for the second chamber has two orifices.

23. A manual cleaner according to claim 22 wherein the second chamber has a pressure of about 40 pounds per square inch.

24. A manual cleaner according to claim 17 wherein the fabric/carpet cleaning composition comprises one or more of cleaning solvents, a surfactant and a fragrance.

25. A manual cleaner according to any of claim 17 wherein the fabric/carpet cleaning composition includes a pH adjusting agent to maintain a pH level between 7.5 and 12.0 in order to trigger release of oxygen in the peroxide composition when the two compositions are mixed together.

26. A manual cleaner according to claim 25 wherein the pH of the peroxide composition is in the range of about 1.5 to about 8.5.

27. A manual cleaner according to claim 25 wherein the pH of the peroxide composition is about 6.8.

28. A manual cleaner according to claim 26 wherein the pH is about 9.5.

29. A manual cleaner according to claim 17 wherein the dispensing system is adapted to mix the two compositions together in a single dispensing outlet before they are dispensed from the dispensing outlet.

30. A manual cleaner according to claim 29 wherein the single dispensing outlet has a mechanical breakup plug and a terminal orifice to mix and disperse the mixture of the compositions into a pattern.

* * * * *

UNITED STATES PATENT AND TRADEMARK OFFICE
CERTIFICATE OF CORRECTION

| | | |
|---|---|---|
| PATENT NO. | : 7,906,473 B2 | |
| APPLICATION NO. | : 10/604780 | |
| DATED | : March 15, 2011 | |
| INVENTOR(S) | : Jesse J. Williams et al. | |

It is certified that error appears in the above-identified patent and that said Letters Patent is hereby corrected as shown below:

Column 16, Claim 25, line 29, reads: "A manual cleaner according to any of claim 17..."

It should read: "A manual cleaner according to claim 17..."

Signed and Sealed this
Third Day of May, 2011

David J. Kappos
*Director of the United States Patent and Trademark Office*